US009437115B2

(12) United States Patent
Ghosh et al.

(10) Patent No.: US 9,437,115 B2
(45) Date of Patent: Sep. 6, 2016

(54) METHOD AND SYSTEM FOR DISTANCE EDUCATION BASED ON ASYNCHRONOUS INTERACTION

(75) Inventors: Hiranmay Ghosh, Gurgaon (IN); Gautam Shroff, Gurgaon (IN); Arpan Pal, Kolkata (IN); Ranjan Dasgupta, Kolkata (IN); Tavleen Oberoi, Gurgaon (IN); Sujal Subhash Wattamwar, Gurgaon (IN); Kingshuk Chakravarhy, Kolkata (IN)

(73) Assignee: Tata Consultancy Services Limited (IN)

( * ) Notice: Subject to any disclaimer, the term of this patent is extended or adjusted under 35 U.S.C. 154(b) by 194 days.

(21) Appl. No.: 14/234,989

(22) PCT Filed: Jun. 22, 2012

(86) PCT No.: PCT/IN2012/000445
§ 371 (c)(1),
(2), (4) Date: Jan. 24, 2014

(87) PCT Pub. No.: WO2013/051020
PCT Pub. Date: Apr. 11, 2013

(65) Prior Publication Data
US 2014/0193793 A1 Jul. 10, 2014

(30) Foreign Application Priority Data
Jul. 26, 2011 (IN) .......................... 2119/MUM/2011

(51) Int. Cl.
*G09B 3/00* (2006.01)
*G09B 5/12* (2006.01)
*H04L 29/06* (2006.01)

(52) U.S. Cl.
CPC ............. *G09B 5/12* (2013.01); *H04L 65/4007* (2013.01); *H04L 65/4076* (2013.01); *H04L 65/4084* (2013.01)

(58) Field of Classification Search
USPC ................................. 434/322, 323, 350, 365
See application file for complete search history.

(56) References Cited

U.S. PATENT DOCUMENTS

| | | | |
|---|---|---|---|
| 5,592,470 A | 1/1997 | Jaisingh et al. | |
| 6,074,216 A | 6/2000 | Cueto | |
| 7,836,481 B1* | 11/2010 | Hendricks | H04H 20/06 348/729 |
| 8,239,905 B2 | 8/2012 | Li et al. | |
| 2007/0134644 A1* | 6/2007 | Jones | G09B 5/06 434/365 |
| 2009/0263777 A1* | 10/2009 | Kohn | G09B 7/00 434/350 |
| 2011/0065082 A1* | 3/2011 | Gal | G09B 7/02 434/365 |

OTHER PUBLICATIONS

Paul England et al, "RAVE: Real-Time Services for the Web," International World Wide Web Conference, May 6-10, 1996, Paris, France (14 pages).
Yurong Hu and Victor O. K. Li, The University of Hong Kong, "Satellite-Based Internet: A Tutorial," IEEE Communications Magazine, Mar. 2001 (9 pages).
PCT International Search Report mailed Mar. 22, 2013, issued in International Application No. PCT/IN2012/000445 (3 pages).

* cited by examiner

*Primary Examiner* — Kesha Frisby
(74) *Attorney, Agent, or Firm* — Finnegan, Henderson, Farabow, Garrett & Dunner, LLP

(57) ABSTRACT

The invention facilitates asynchronous interaction between a geographically separated facilitator and at least one user. The said invention provides asynchronous interaction between rural classrooms (teacher-student community) and expert teachers to increase the outreach of the expert teachers much beyond that is permitted with the teachings of the prior art.

21 Claims, 2 Drawing Sheets

METHOD AND SYSTEM FOR DISTANCE EDUCATION BASED ON ASYNCHRONOUS INTERACTION

PRIORITY CLAIM

This is a National Stage Entry under 35 U.S.C. §271 of International Application No. PCT/IN2012/000445, titled "A METHOD AND SYSTEM FOR DISTANCE EDUCATION BASED ON ASYNCHRONOUS INTERACTION," filed Jun. 22, 2012, which claims the benefit of India Application No. 2119/MUM/2011, titled "A METHOD AND SYSTEM FOR DISTANCE EDUCATION BASED ON ASYNCHRONOUS INTERACTION," filed on Jul. 26, 2011, both of which are incorporated herein in their entirety by reference for all purposes.

FIELD OF THE INVENTION

This invention generally relates to a system and method for imparting distance education. More particularly the invention relates to a framework for distance education based on asynchronous interaction between an expert teacher and a plurality of class-rooms.

BACKGROUND OF THE INVENTION

Education to all is considered right in most countries of the world. India alone has around 210 million students studying in 1.4 million schools that provide employment to 7 million people making the education system of India to be the largest in the world. However, dearth of skilled teachers remains a major hindrance to the spread of education, especially in the remote areas of rural India and many other countries.

A lot of focus has been given to improve the education system around the world for example; free online content is made available on internet. Video-conferencing platforms like the Skype and other internet based messengers are also utilized for imparting education in the remote areas. However, such means are rarely utilized by a broader cross-section of population due to the lack of the required infrastructure or expertise. Moreover, the lack of familiarity with the language (English) and the western accent further adds on to the problem in utilizing such means of education.

Government initiatives like "Gyan Darshan" an initiative by Government of India, which is a school education TV channel, is purposed to be 24×7 so that the students may receive the lectures in local languages and via a television set which is readily available. However, even such an approach has a flaw, as the students cannot seek any clarification for any of their doubts relating to the lectures available on the channel.

Application No. US20040248074 proposes a system to provide educational service to a user via network. The main objective of this application is to provide the learning material to the user based on their level of understanding through a test prior to sending the learning material. Further, it discusses about changing the content dynamically based on evaluation during learning process. The proposed system also maintains a pool of supporting members, where one of them is chosen to solve user request based on the field of specialization. The support member may also set their status to indicate their availability to solve user requests and the system selects only from the available members. However, the system described therein is unable to handle a large number of user requests for support and it becomes difficult for any support member to solve the given problems.

US20070020603 describes a system for synchronous communication for distance education using TV. The proposed system provides an interface to the facilitator to deliver lectures, receive requests from students, compose replies and send the composed data over satellite to be viewed by the students. The synchronous interaction has inherent limitation on the number of students a single facilitator can handle at a time. Also, the system requires at least one mobile device one per student, adding to the overall system cost that the students from remote areas may not be able to afford.

U.S. Pat. No. 4,793,813 titled Computer Based Education System describes a system that contains a central computer that serves as the source of learning material, and several terminal machines as user terminals. The learning material is sent over a satellite link from central computer to the computer terminal machines and allows user requests over the telephone line. However, such a system assumes the student station to be a computer terminal and a keyboard-mouse interface that may not be available to students in remote rural areas. Further, the system aims for efficient (high bandwidth) synchronous communication, an infrastructure that may not be commonly available in rural areas of developing nations.

U.S. Pat. No. 6,074,216 titled Intelligent Interactive Broadcast Education, teaches a synchronous mode of delivering lectures that are broadcast from a studio to computer based terminals and the interaction between students and instructor is carried out via internet wherein the questions are in the form of text. This method has an inherent problem as it cannot be applied to questions that are captured in audio or other multimedia format.

The solutions provided by the existing art are inefficient in providing distance education to students in remote rural areas especially in developing countries. Due to the lack of expert teachers locally and unavailability of sophisticated infrastructure a need arises to scale up the offline availability of expert teachers that may contribute towards the education of students based in remote areas.

In order to solve the above mentioned problems, the current invention proposes a system and underlying method for enabling an expert teacher for creating and distributing audio-visual lectures to students located in areas geographically separated from the location of the expert teacher. For example, an expert teacher located in a city and a group of students located in a remote rural area. The present invention will enable and motivate a larger cross-section of educationists to participate in rural education with an improved efficiency and extended outreach. The present invention is also able to effectively serve a large number of queries by a geographically distributed massive student population through asynchronous interaction. The system and method described below blends the benefits of Direct-To-Home (DTH) and Internet technologies to achieve a large footprint together with interactivity with remotely located teachers at low cost.

Other features and advantages of the present invention will be explained in the following description of the invention having reference to the appended drawings.

OBJECTS OF THE INVENTION

It is a primary object of the invention to provide, a system and a related method for enabling asynchronous interaction between expert teachers and rural class-rooms wherein the expert teachers and rural class-rooms are geographically separated.

It is another object of the invention to scale up the bandwidth of the expert teachers to reach a larger cross-section of students in rural class-rooms than that can be achieved by the state of art technology.

Another objective of the invention is to provide a system based on low-cost and familiar equipment that is readily available to the rural students.

It is another object of the invention to provide a method of asynchronous interaction between one or more rural classrooms and an expert teacher wherein the expert teacher may review one or more student information requests at his own convenient time and the expert teacher is enabled to group many similar student information requests and answer them together.

It is an object of the invention to provide flexibility in scheduling a lecture at a convenient time for the students.

Another object of the invention is to automatically capture and integrate context information in the asynchronous interaction between student groups and expert teachers.

It is another objective of the present invention to enable embedding interactive rhetoric questions in a lecture created by the expert teacher in video format and synchronization of such interactive rhetoric questions with the lecture while playing the same.

It is yet another object of the invention to group answer to similar questions from multiple classrooms leading to higher efficiency of expert teachers and increased outreach.

SUMMARY OF THE INVENTION

Before the present methods, systems, and hardware enablement are described, it is to be understood that this invention in not limited to the particular systems, and methodologies described, as there can be multiple possible embodiments of the present invention which are not expressly illustrated in the present disclosure. It is also to be understood that the terminology used in the description is for the purpose of describing the particular versions or embodiments only, and is not intended to limit the scope of the present invention.

The present invention describes a novel framework for distance education that enables asynchronous interaction between expert teachers and remote classrooms.

In an embodiment, the present invention describes a method for enabling asynchronous interaction between a facilitator and at least one user that are geographically separated from each other. A multimedia-based message from the facilitator may be sent to a broadcasting station over a network. The broadcasting station broadcasts the multimedia-based message to the user through a network having large bandwidth such a satellite network using Direct-To-Home technology. In an aspect, the multimedia-based message may be created by the facilitator himself. In another aspect, the multimedia-based message may be a linear and passive presentation in audio, visual or audio-visual format. Further, there may be a set of one or more information requests, related information responses and metadata relating to the multimedia-based message. Such data may be created by the facilitator and stored in a content repository.

The multimedia-based message is received by the user the user employing a device connected to the network having large bandwidth and to a multimedia communication means. Thereafter, the metadata and at least one information requests are automatically retrieved from the content repository through a network having low bandwidth such as internet by using a multimedia communication means. In an aspect, the multimedia communication means may be a Home-Infotainment box. The information request is displayed at a media time point defined in the metadata while displaying the corresponding multimedia-based message. Such a media time point may be defined by the facilitator in the related metadata, during the creation of the multimedia-based message. A media time point is a moment or point in time in the multimedia-based message. The user may be enabled to send an information response corresponding to said information request that may be evaluated by the multimedia communication means by using the metadata. Based upon the evaluation of the information response a second information response may be displayed by employing the metadata. In an aspect, the information requests and corresponding responses may be present in the metadata.

In an aspect, the first information response may be a response sent by the user in reply to the first information request and the second information response may be the correct information response to the first information request as defined in the metadata.

In an embodiment, the present invention may enable subsequent retrieval and sequential display of plurality of information requests by the multimedia communication means employing the metadata. In an aspect the retrieval & display of the plurality of information requests may be based on the evaluation of information response received corresponding to the preceding information request.

In an embodiment, the information requests may be embedded rhetoric questions in text, audio, audio-visual format or combination thereof.

In an embodiment, the present invention may enable the user to send and store a query in the content repository through a network having low bandwidth by the multimedia communication means. In an aspect the network having low bandwidth may be internet. Such a query may be retrieved by a tutor. Upon retrieving such query the tutor may be enabled to send a reply to the corresponding query, and the reply may be stored in the content repository. The reply may then be retrieved by the user from the content repository through a network having low bandwidth using the multimedia communication means.

In an aspect, the tutor may be same as the facilitator described in previous paragraphs.

In an aspect, the query may be a question from the user and the reply may be an answer sent by the tutor to the query.

In an embodiment, the network having low bandwidth may be internet.

In an aspect, the information requests and information responses may in any of the text, audio, visual, audio-visual format.

In an embodiment, a plurality of different users may send a plurality of query regarding the same multimedia-based message. The tutor in such a case may be enabled to group the plurality of query based on their similarity and may send a single tutor to all the similar query, hence raising the efficiency.

In an aspect, the present invention allows sending a broadcast lecture over DTH and a related question answer session over Internet. Hence, the present invention addresses the problem of high bandwidth unavailability in remote areas.

In an aspect, the present invention synchronizes the interactions over two different channels such as DTH and internet. For example, broadcast of multimedia content via DTH and a Question answer session between an expert teacher/a tutor and a group of remotely located students over Internet are synchronized.

In one aspect of the invention, a method of telecasting a pre-recorded lecture by an expert teacher is described that may be in the form of audio-video multimedia combined with text to a plurality of remotely situated school using satellite based Direct-To-Home (DTH) technology. The telecasted lecture may be played back on a device that may be able to provide the lecture to a number of students simultaneously such as a Television set in a classroom environment.

In another aspect of the present invention describes a method of integration and synchronization of Direct-To-Home (DTH) technology (large bandwidth) with Internet (low bandwidth). The pre-recorded lectures may be broadcasted through satellite using Direct-To-Home and may be received on a television. The asynchronous interactions between the remote classroom and expert teachers may be carried out over Internet.

In an aspect, the present invention may enable embedding a plurality of interactive rhetoric questions in the video lecture to be transmitted.

In another aspect, the embedded interactive rhetoric questions in the video lecture may be synchronized with specific time points in the video lecture.

In an embodiment, the present invention may provide a method for distance education using asynchronous interaction between a teacher and at least one remote classroom having a plurality of students. Such a method may enable creation of a lecture and at least one related metadata and embedded question by the teacher employing a computer based authoring station. The created lecture may then be sent from the authoring station to a broadcasting station and the related metadata and embedded question to a content repository over a network. The broadcasting station receives the lecture and then further broadcasts it to a student station situated in the remote classroom through a network having large bandwidth. In an aspect, the having large bandwidth may be a satellite network based on Direct-To-Home technology. Upon receiving the lecture, a metadata and at least one embedded question related to the lecture are automatically retrieved from a content repository. Such automatic retrieval is executed by the student station through a network having low bandwidth. In an aspect, the network having low bandwidth may be internet. Further, the student station displays the embedded question at a media time point defined in the metadata while displaying the lecture. In an embodiment, the student station may enable obtaining from the remote classroom a first response with respect to the displayed embedded question. The student station may further evaluate the first response and retrieve a second response based on the evaluation of the first response.

In yet another embodiment, the student station may facilitate the students present in the remote classroom to send a student request. Such student request may then be sent & stored in the content repository through the network having low bandwidth by the student station. In reply to the student station a tutor response may be retrieved from a tutor station. This tutor response may be sent and stored in the content repository. Such a tutor response may be retrieved from the content repository by the students in the remote classroom through the network having low bandwidth using the student station.

It is to be noted that the system and method described above merely provide an outline of the present invention and the same may include various other components and method steps.

BRIEF DESCRIPTION OF DRAWINGS

The foregoing summary, as well as the following detailed description of preferred embodiments, is better understood when read in conjunction with the appended drawings. For the purpose of illustrating the invention, there is shown in the present document example constructions of the invention; however, the invention is not limited to the specific methods and apparatus disclosed in the document and the drawing.

DETAILED DESCRIPTION OF THE INVENTION

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems, methods, apparatuses, and devices similar or equivalent to those described herein can be used in the practice or testing of embodiments of the present invention, the preferred, systems and parts are now described. The disclosed embodiment is merely exemplary of the invention, which may be embodied in various forms. The scope of the invention is not restricted to the listed embodiments and is limited only by the appended claims.

The disclosed embodiments are merely exemplary of the invention, which may be embodied in various forms.

In an aspect the present invention describes a method of telecasting a pre-recorded lecture by an expert teacher that may be in the form of audio-video multimedia combined with text to a plurality of remotely situated classrooms using a broadcasting technology such as a satellite based Direct-To-Home (DTH) technology. The telecasted lecture may be played back on a device that may be able to provide the lecture to a number of students simultaneously such as a Television set in a classroom environment.

Direct-To-Home (DTH) technology refers to the reception of satellite signals on a TV with a personal dish in an individual home etc. The satellites that are used for this purpose is geostationary satellites. The satellites compress the signals digitally, encrypt them and then are beamed from high powered geostationary satellites.

Figure 1:
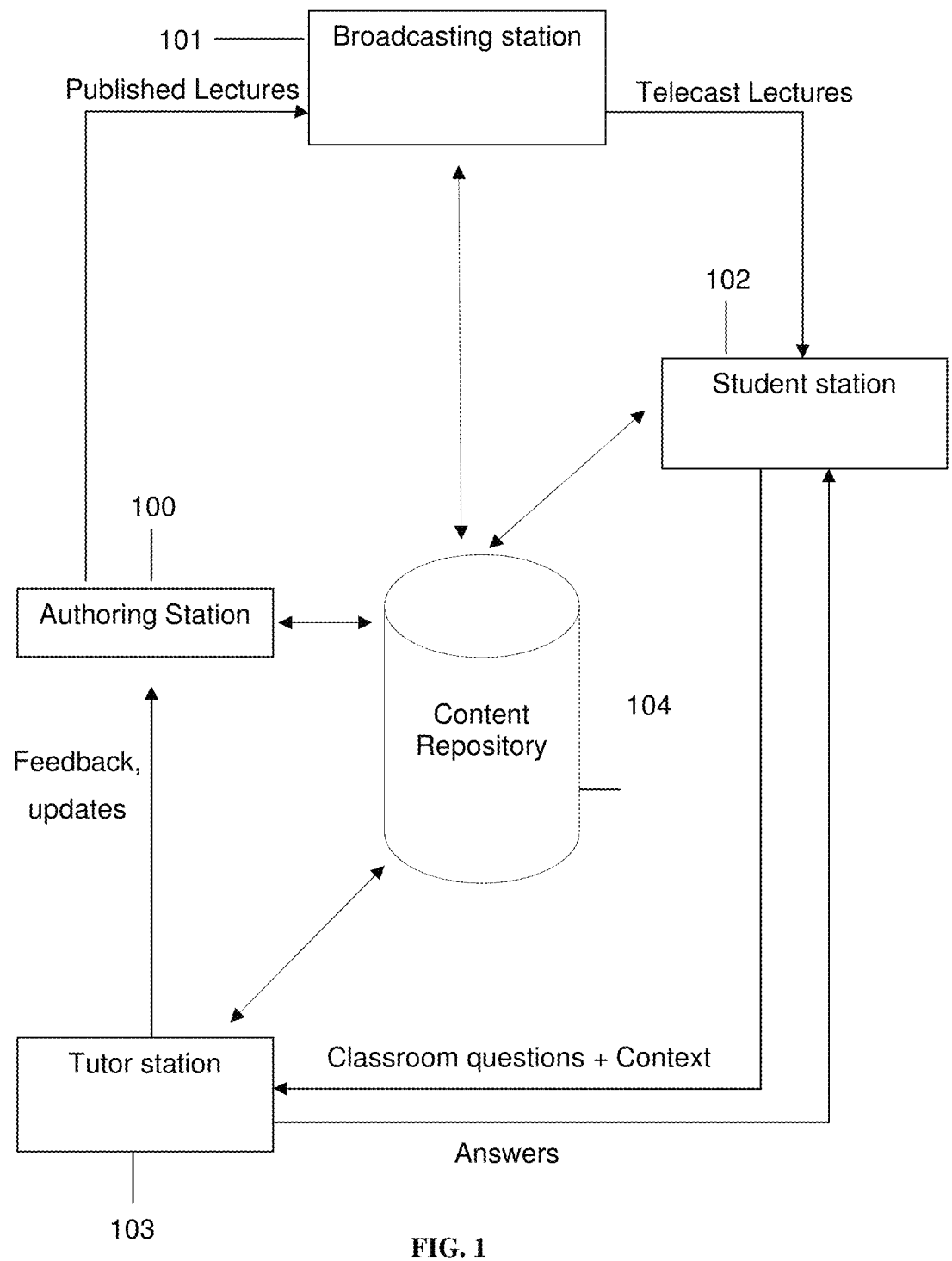
FIG. 1 illustrates the Architectural framework for the Distance Education system as described in an embodiment of the present invention.

As illustrated in FIG. 1, Authoring station (100) may be a computer based system and is used by an expert teacher to create a multimedia content based lecture. The station may be equipped with a content editor that may enable the teacher to combine a variety of multimedia contents that may be stored to facilitate future editing and publishing for telecasting. For example, the content editor may enable incorporation of multiple sound tracks in a video and subtitles in regional languages. The content editor may also enable incorporating and editing a plurality of Rhetoric Question Hierarchy (RQH) in multimedia format that may be introduced in between the pre recorded lecture. These embedded interactive Rhetoric Questions in the video lecture may be synchronized with specific time points in the video lecture. The Patent application nos. 2891/MUM/2010, titled "Multimedia Presentation Content Synthesis" and 1339/MUM/2010, titled "Multimedia Book" relate to an Authoring Station such as the one described herein.

In an embodiment, the authoring station may be a mobile device based system wherein the mobile device may be a PDA, laptop, smartphone etc.

In an embodiment the rhetoric questions may be multiple-choice type questions. Such rhetoric questions may be organized in a hierarchy and may be interlinked with each other. The interlinking information may be available in a metadata file.

In an embodiment, the authoring station may also enable adaptation of pre recorded lectures for students speaking different languages. For example, the authoring station may enable re-articulating a lecture in different languages and inserting examples appropriate for a social/ethnic student group.

In another embodiment, the authoring station may also enable incorporation of multiple sound tracks in a video and subtitling in different languages.

The lectures created by the expert teachers are then sent to the broadcasting station (101) for broadcasting the same to a plurality of remote classrooms over a network. In an embodiment, the present invention may also find various applications in multiple domains such as vocational training, large enterprises for training its employees etc.

The related metadata and the embedded questions are sent from the authoring station (100) and stored in a content repository (104)

Broadcasting station (101) enables broadcast of the pre-recorded lectures prepared on the authoring station (100) to a plurality of student stations (102) in remote classrooms. The broadcasting station in accordance with one of the embodiments may utilize the Direct-To-Home (DTH) technology for broadcasting the multimedia content. The broadcasting station may broadcast the lectures according to a course calendar or schedule prepared in accordance with the education authorities.

Student station (102) enables a group of students to view and interact with the telecast lectures in a classroom environment. The interaction may be mediated by a local teacher. The student station (102) may comprise of a Television and a Home Infotainment Platform (HIP) Box. In an embodiment, the student station may enable the students to enter a solution to the rhetoric question by using a device such as a Television remote.

In an embodiment, a group of students in a classroom may answer a rhetoric question by using a remote control device, such answers may be automatically evaluated by the HIP box. Thereafter the HIP box by using the related metadata may provide the correct answer to the rhetoric question automatically on a display screen. Based on whether the answer submitted by the students is correct or incorrect another rhetoric question may be displayed on the display screen, by the HIP box by using the related metadata.

In an embodiment, the present invention may enable interaction between the HIP box and at least one large database such as content repository (104).

Home Infotainment Platform is a low-cost device that blends the video output from a DTH Set top box with local contents and creates a seamless presentation on the TV. It can also connect to Internet using a wireless USB Internet adapter. It can record telecast video and has an in-built media-player. The HIP box looks like a set top box and may have a few USB ports for peripherals. It may have applications that may enable accepting video feeds from any video source (digital/analog) and may also enable interactivity and other value added interactive video based services via CDMA/GSM/3G & ADSL broadband connection. The HIP Box may automatically record the lectures and downloads corresponding metadata and rhetoric questions without human intervention. The HIP Box starts with playing the recorded video and interprets the metadata file to pop up rhetoric questions at media time points as defined in the metadata. In an aspect, the rhetoric questions and the responses may be in an audio or audio-visual or text format. The patent application no. WO 2010082208A2, titled "Methods and Systems for wireless/wired transmission" describes the Home Infotainment Platform a specially designed hardware employed to combine DTH and Internet channels.

In an embodiment, the HIP means may enable choosing the language of a lecture that may be available in multiple languages.

The student station (102) may also enable recording a plurality of questions that may be sent by the students or by a local teacher on the behalf of students to expert tutors or the expert teachers. The question may automatically capture the context of the broadcast course video. In an embodiment, the questions asked may be recorded in an audio or audio-visual or text format.

In another embodiment, the questions asked by the students or by the local teacher along with the context information or metadata may be forwarded to a content repository (104) that may be accessed a tutor or the expert teacher's attention. In an embodiment the local teacher may mediate between the students and the student station. In another embodiment, the student station (102) may enable the students to ask questions regarding a lecture. Further, the present system may enable the local teacher to query the content repository (104) that may provide an answer to the rhetoric question if the same question has been asked and replied to, earlier in another remote classroom.

In an embodiment, the student station may also include a voice capturing facility such as a microphone and a video capturing facility such as a camera or a web camera.

In an embodiment the student station (102) may enable certain Web browser applications for Internet browsing and a regional language support as well as Email facility.

In another embodiment, the student station may enable video conferencing, video chat and video on demand and may also enable face-to-face interactions between students and expert teachers.

In yet another embodiment, the student station (102) may provide an SMS voting option that may be utilized for voting on lectures or evaluation.

In an aspect, the present invention may enable capturing the metadata related to a lecture along with an associated interaction information such as questions asked by students during the lecture. The captured metadata and associated interaction information may then be forwarded to the tutor station (103).

Tutor station (103) enables the back-end tutors or the expert teacher to reply to the questions generated from multiple classrooms. The tutor station (103) enables the asynchronous mode of interactivity between the expert teachers and students in a plurality of remote classrooms. The tutor may browse through the questions and may either answer a question individually or may group a set of similar questions and answer them in one go. The tutor station (103) may be provided with a lightweight content editor that may enable a tutor to compose an answer by combining a plurality of multimedia data elements. In an embodiment the interaction between the tutor and the remote classrooms may be recorded for future reference. For example, if questions on a specific topic are raised by a large number of classrooms, the expert teacher may like to add more discussions on the topic. In an embodiment, the expert teacher may be the facilitator himself.

Content Repository (104) controls the interactions between all the system components. It holds all contents pertaining to the system. In an embodiment, the content repository (104) may hold Reusable educational contents that are elementary learning objects in multimedia format that may be contributed by a plurality of authors or independent content creators and may be reused for future reference. In an embodiment, the content repository (104) may store all the data at the authoring station (100). The content repository may also store Published Lectures that are the final work-products from of the authoring station (100). The published lectures along with associated metadata and rhetoric questions may be stored in the content repository to enable telecasting and for the reference of the tutors. The content repository may also store telecast schedules created by the Broadcasting station that may be referred by the Student stations and may enable controlling actual telecast operation. In another embodiment, a plurality of questions from classrooms along with the associated answers may also be stored in the content repository (104). Indian Application no. 1742/MUM/2010, titled "A System and Method for Non-Linear access of Multimedia Data from a Multimedia Collection" relates to a Content Repository as described above.

In an embodiment, the present invention describes a method for distance education using asynchronous interaction between an expert teacher and at least one remote classroom having a plurality of students. The expert teacher creates a lecture to be delivered to the remote classroom on the authoring station. Such a lecture is then sent to the broadcasting station over a network. The broadcasting server receives the lecture and further broadcasts it to the student station placed in the remote classroom through a network having large bandwidth such as a satellite network using Direct-To-Home technology. The student station upon receiving the lecture retrieves metadata and one or more embedded questions related to the lecture from the content repository through a network having low bandwidth such as internet. The student station then displays the embedded questions at a corresponding media time point defined in the metadata while displaying the lecture. Once the embedded question is displayed a first response may be obtained from the students by using a device such as a TV remote control. Thereafter the HIP box of the student station by using the related metadata may provide a second response to the rhetoric question automatically on a display screen. Based on whether the answer submitted by the students is correct or incorrect another rhetoric question may be displayed on the display screen, by the HIP box by using the related metadata.

In another embodiment, the plurality of students may be enabled to send a student request by using the student station. Such information request is then sent and stored in the content repository through a network having low bandwidth such as internet by the student station. Subsequently, a tutor response from a tutor station relating to the information request may be retrieved and stored in the content repository. Such a response may then be retrieved from the content repository by using the student station through a network having low bandwidth such as a slow-speed internet. Preferably the student request is in audio format.

In an aspect, the present invention may provide a separate support team that may be responsible for content creation, lecture evaluation of the lectures created by the expert teachers, course scheduling and content broadcast. This may help in maintaining the quality of the lectures and the service as a whole.

In an embodiment, the present invention enables capturing metadata related to the lecture along with associated interaction information.

In an embodiment, the present invention may provide a plurality of multilingual broadcasts of lectures such that a lecture video may have its narration and rhetoric questions in multiple languages. The students may be enabled to select their preferred language from the Student Station (102) and may interact in that particular language.

In an embodiment, the system of the invention may be powered by solar cells.

Figure 2:
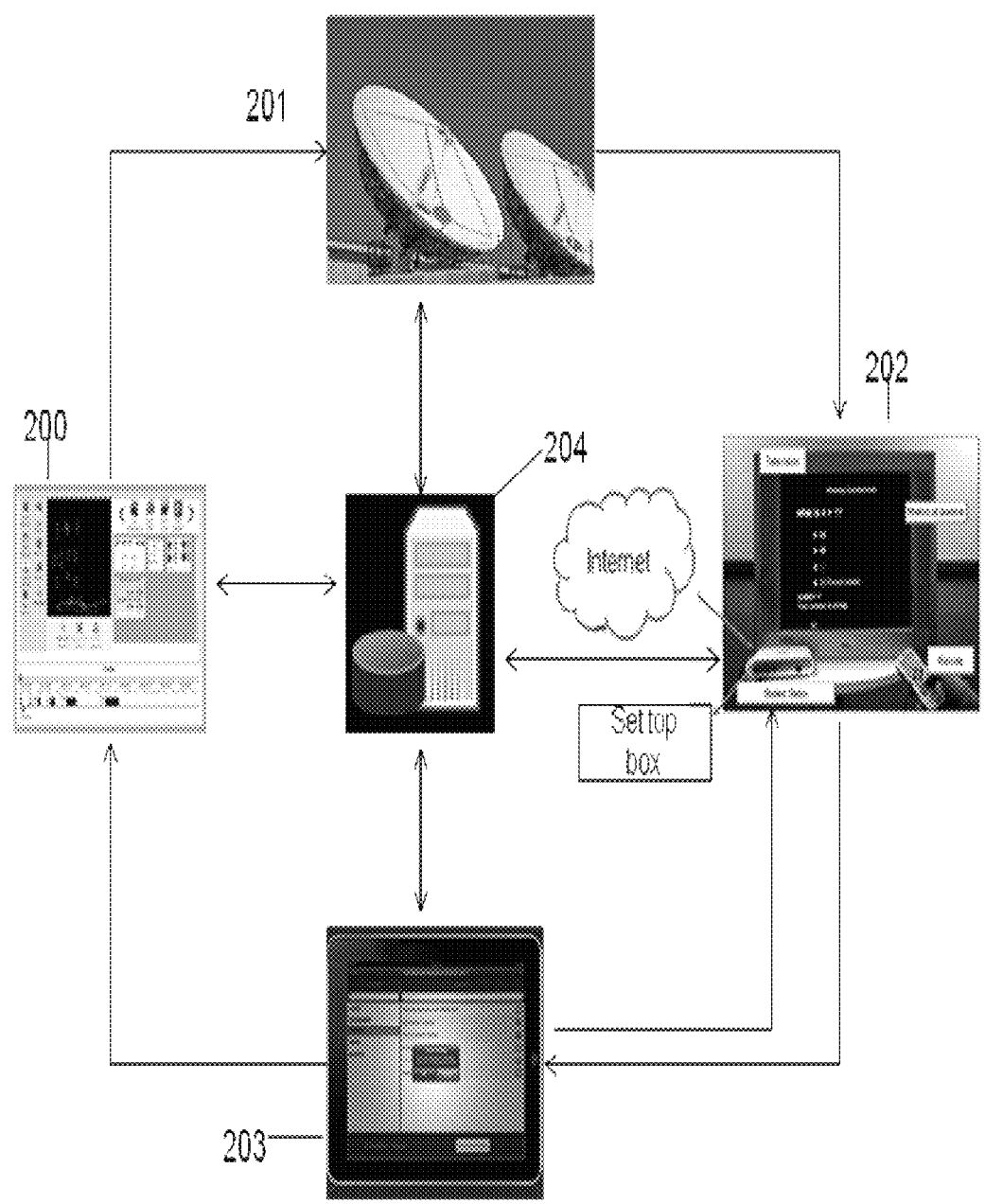
FIG. 2 describes an exemplary embodiment of the present invention.

FIG. 2 illustrates an exemplary embodiment of the present invention wherein the Authoring station (200) may be a computing device such as a personal computer or PDA etc. that may be accessed by the expert teacher for creating a lecture. The lecture created on the Authoring station (200) is then sent to the broadcasting station (201) that broadcasts the multimedia lecture to a plurality of remote classrooms having a student station (202) such as television. The use of the student station may either be mediated by a local teacher or the students themselves may be able to utilize it. The student station (202) includes a Home Infotainment Platform (HIP) box that is enabled to connect with a set top box (STP) and may also have an internet connection. The HIP box is also connected with the television on which the students are able to watch the lecture along with the embedded rhetoric questions. The students are enabled to answer the rhetoric questions which may generally have a plurality of probable answers along with them. The students may choose at least one of the plurality of probable answers by utilizing a remote such as a television remote.

The preceding description has been presented with reference to various embodiments of the invention. Persons skilled in the art and technology to which this invention pertains will appreciate that alterations and changes in the described structures and methods of operation can be practiced without meaningfully departing from the principle, spirit and scope of this invention.

We claim:

1. A method for enabling asynchronous interaction between a first station and a second station, the method comprising:

receiving, at the second station, a multimedia-based message via a first network having a first bandwidth, the second station being geographically separated from the first station, wherein the multimedia-based message comprises embedded metadata, wherein the metadata comprises a media time point during a duration of the display of the multimedia-based message for at least one rhetoric question hierarchy (RQH);

obtaining, based on the embedded metadata, via a second network having a second bandwidth, at least one RQH associated with the multimedia-based message from a content repository, wherein the first bandwidth is larger than the second bandwidth;

displaying the multimedia-based message and the information request at the media time point included in the metadata;
receiving a first response to a first question in the at least one RQH; and
evaluating the first response.

2. The method of claim 1, further comprising at least one of:
displaying a second question based on the evaluation of the first response and the metadata; and
displaying a plurality of subsequent questions, wherein the plurality of subsequent questions are based on the metadata and the evaluation of the second information response with respect to the preceding information request.

3. The method of claim 1, further comprising:
obtaining a user query;
transmitting the query to the content repository via the second network; and
retrieving a response to the query from the content repository via the second network, the response being provided by a third station.

4. The method of claim 3, wherein the query and the response comprise at least one of: a text, an audio, or an audio-visual format.

5. The method of claim 1, wherein the at least one RQH is an embedded rhetoric question having at least one of: a text, an audio, or an audio-visual format.

6. The method of claim 1, wherein the first network is a satellite based Direct-To-Home network.

7. The method of claim 1, wherein the second network is the Internet.

8. The method of claim 1, wherein the second station is connected to the first network via a set top box.

9. The method of claim 1, wherein the second station is connected to the second network via a multimedia communication device, the multimedia communication device being a Home Infotainment Platform box connected to at least a set top box.

10. The method of claim 1, wherein the second station is connected to the second network via a multimedia communication device, the multimedia communication device providing a regional language support.

11. The method of claim 1, wherein the multimedia-based message is transmitted from the first station to the second station via a broadcasting station.

12. A method for enabling asynchronous interaction between an authoring station and at least one remote student station associated with a plurality of students, the method comprising:
receiving, at the at least one remote student station, a lecture via a first network having a first bandwidth, wherein the lecture comprises embedded metadata, wherein the metadata comprises a media time point during a duration of the display of the multimedia-based message for at least one question;
obtaining, based on the embedded metadata, via a second network having a second bandwidth, at least one question associated with the lecture from a content repository, wherein the first bandwidth is larger than the second bandwidth;
displaying the lecture and the at least one question at the media time point included in the metadata;
receiving, a first response with respect to the at least one question;
evaluating the first response; and
displaying a second response based on the evaluation of the first response.

13. The method of claim 12, further comprising at least one of:
obtaining a student request;
transmitting the student request to the content repository via the second network; and
retrieving a tutor response with respect to the student request from the content repository via the second network, the tutor response being provided by a tutor station.

14. The method of claim 12, wherein:
the lecture, the metadata, and the at least one question are generated by the authoring station;
the lecture is transmitted from the authoring station to the student station via a broadcasting station; and
the metadata and the at least one question are transmitted from the authoring station to the content repository.

15. A system for enabling asynchronous interaction between an authoring station and at least one remote student station associated with a plurality of students, the system comprising:
a student station configured to:
receive a lecture via a first network having a first bandwidth, wherein the lecture comprises embedded metadata, wherein the metadata comprises a media time point during a duration of the display of the multimedia-based message for at least one question;
obtain, based on the embedded metadata, via a second network having a second bandwidth, at least one question associated with the lecture from a content repository, wherein the first bandwidth is larger than the second bandwidth;
display the lecture and the at least one question at the media time point included in the metadata;
receive a first response with respect to the at least one question;
evaluate the first response, and
display a second response based on the evaluation of the first response.

16. The system of claim 15, wherein the student station includes at least one of: a Home Infotainment Platform box that is connected to at least one of a set top box, a television set, or a remote control device.

17. The system of claim 16, wherein the student station further includes a voice capturing device and a video capturing device.

18. The system of claim 16, wherein the remote control device is configured to enable answering of the question.

19. The system of claim 15, wherein the student station is further configured to:
obtain a student request;
transmit the student request to the content repository via the second network; and
retrieve a tutor response with respect to the student request from the content repository via the second network, the tutor response being provided by a tutor station.

20. The system of claim 19, wherein the student request comprises an audio format.

21. The system of claim 15, further comprising:
an authoring station configured to generate the lecture, the metadata, and the at least one question; and
wherein the lecture is transmitted from the authoring station to a broadcasting station, the metadata and the at least one question is transmitted from the authoring station to the content repository, the broadcasting station is configured to broadcast the lecture via the first network, the first network is a satellite based Direct-To-Home network, and the content repository is configured to store the metadata and the at least one question.

\* \* \* \* \*